(No Model.)
W. H. BOYD.
MANURE POUCH.
No. 390,000.        Patented Sept. 25, 1888.
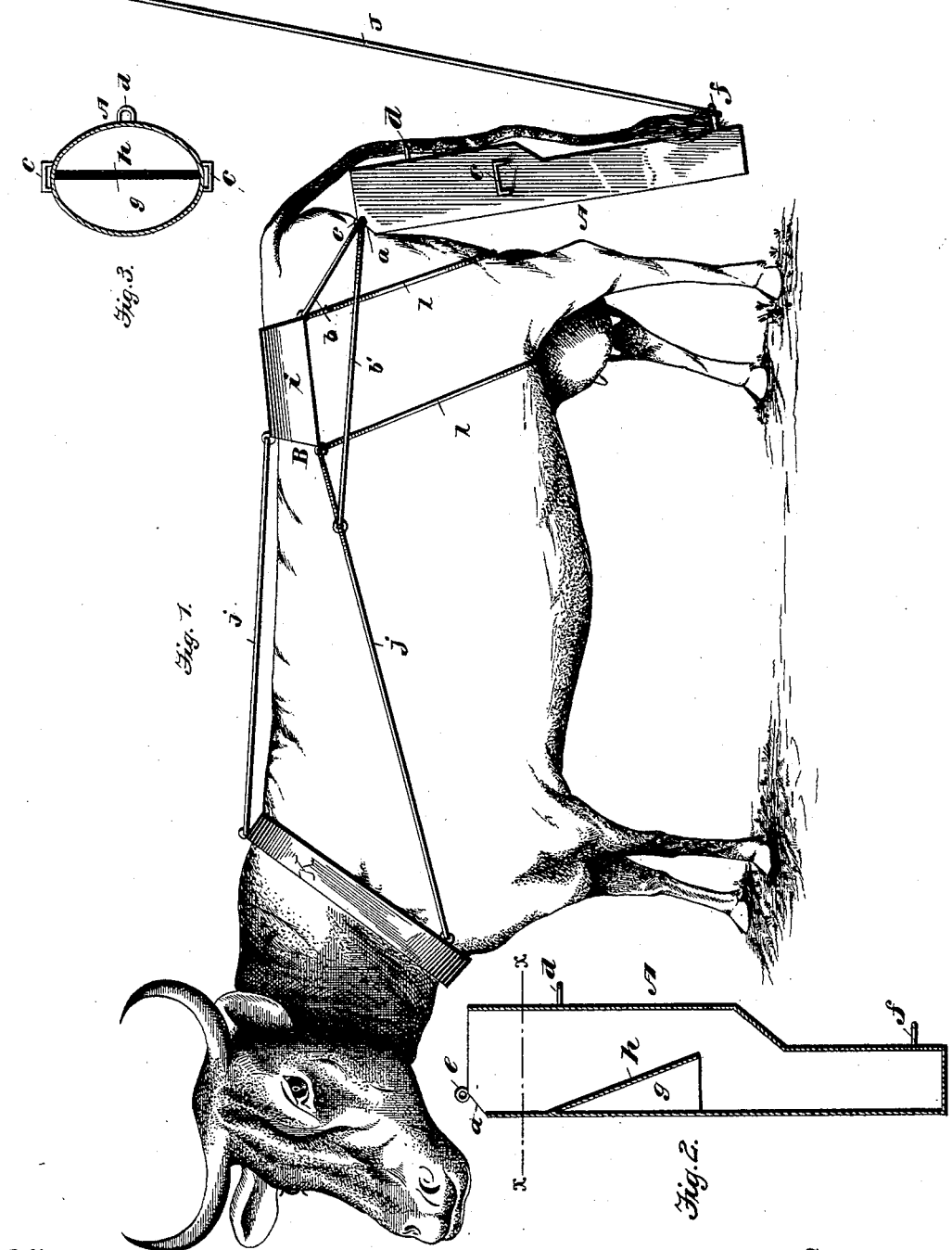
Witnesses
Inventor
W. H. Boyd.
By his Attorneys
Smith & Sheehy

United States Patent Office.

WILLIAM H. BOYD, OF ST. CHARLES, MINNESOTA.

MANURE-POUCH.

SPECIFICATION forming part of Letters Patent No. 390,000, dated September 25, 1888.

Application filed June 29, 1888. Serial No. 278,551. (No model.)

*To all whom it may concern:*

Be it known that I, WILLIAM H. BOYD, a citizen of the United States, residing at St. Charles, in the county of Winona and State of Minnesota, have invented certain new and useful Improvements in Cattle-Waste Receivers; and I do declare the following to be a full, clear, and exact description of the invention, such as will enable others skilled in the art to which it appertains to make and use the same.

This invention has relation to improvements in devices for receiving the excrement and urine or "waste" of cattle; and it consists in the peculiar combination and arrangement of the various parts for service, as will be hereinafter more fully set forth, and particularly pointed out in the claim.

The main object of the invention is to provide a receptacle or reservoir so constructed as to fit the particular animal upon which it is designed to be supported and carried, and which will at all times and under all circumstances catch the urine or excrement from cattle while the latter are within the barn or stable, thereby saving a valuable fertilizer, and the labor and trouble experienced in keeping the barn in a tidy condition, while at the same time it keeps the cattle clean and dry, also saving the expense for bedding, &c.

The invention and its advantages will be fully understood from the following description and claim when taken in connection with the accompanying drawings, in which—

Figure 1 shows an animal having my improved device in position thereon. Fig. 2 is an enlarged detached vertical sectional view of the excrement and urine receiving vessel. Fig. 3 is a transverse sectional view taken on the line *x x* of Fig. 2.

Referring by letter to the said drawings, A designates the receiving-receptacle, of any desired shape or pattern, but preferably of a circular or elliptical form. This receptacle comprises a tube made of any suitable material— such as galvanized iron and the like—and it is formed at the upper forward edge with an angle or bevel, *a*, which adapts the said receptacle to lie close to and fit the animal snugly at that point. At the upper angle of the bevel *a*, I provide an attaching eye or loop, *e*, for the harness-straps *b b*, presently explained.

The receptacle A may be provided with suitable handles, *c c*, mainly for the purpose of carrying the receptacle to empty the contents. Near the upper end of the receptacle, on the rear side thereof, is located a hook, *d*, which serves to hold the receptacle A out of the way when not in use, as will be presently explained. At or near the lower end of the receptacle is located an eye or loop, *f*, to which I attach a rope or other suitable fastening device, by means of which the lower end of the receptacle is suspended to be raised or lowered, as will be hereinafter explained. The receptacle is attached to the animal and held in position thereon by means of the eye *e* and the fastening-straps *b b*, which connect with a harness, presently described.

The lower portion of the receptacle A is reduced or contracted, as clearly shown in Fig. 2, and in this contracted end all falling urine or excrement is adapted to be held and confined. To the upper or larger portion of the receptacle I form a water-tight pocket or vessel, *g*, which is constructed by inserting a straight partition, *h*, of sufficient length in the said receptacle, with its upper end and sides joined to the sides of the receptacle by solder or otherwise, to make a water-tight joint. It will be seen that the pocket *g* tapers vertically with the large end toward the bottom of the receptacle, and this end is open.

B designates the harness which I employ in connection with the receptacle A, and which serves to hold and sustain the latter in an easy position upon the animal at all times. This harness consists of a pad or saddle, *i*, placed immediately posterior of the point of the hip, provided with loops or eyes, to which are connected the attaching-strap *b*, straps *l l*, and the straps *j j*, the latter being in turn connected to a yoke or collar, K, of any desired pattern. I also connect the eye *e* and one of the straps *j* by a strap, *b'*.

J designates a rope that is connected at its lower end, through the medium of the eye or loop *f*, to the receptacle A at that point, while the upper end of said rope may be suitably attached to the ceiling above or to any desired attaching-point. It will be understood that when the animal lies down the lower end of the reservoir will recede by means of the rope J until it assumes approximately a horizontal position, and all liquids within the same will be prevented from being thrown out by flowing into the water-tight pocket $g$.

The operation of the device is obvious. Slight changes may be made as to the exact form and proportion of the various parts of the invention without departing from the spirit or gist of the same or without sacrificing the advantages or principle thereof.

It will be here observed that the straps or ropes $l\ l$ are attached to the posterior corners of the pad or saddle, and are carried between the hind legs and brought up close to the flank and attached to the interior corners of the saddle or pad for the purpose of sustaining the harness in place when the receptacle or receiver is detached.

Having described my invention, what I claim is—

A cattle excrement and urine receiver composed of a main body reduced at its lower portion, and a pocket in the said body above the reduced portion having a downwardly-opening mouth, whereby the urine is retained when the receptacle has been inverted, the whole being adapted to be supported on a cow, substantially as specified.

In testimony whereof I affix my signature in presence of two witnesses.

WILLIAM H. BOYD.

Witnesses:
W. A. FINKELNBURG,
CHAS. ALBRECHT.